Jan. 10, 1967   J. SAGERER   3,296,720
GRAB SHOVEL FOR TRACTIVE VEHICLES
Filed Aug. 29, 1963   5 Sheets-Sheet 1
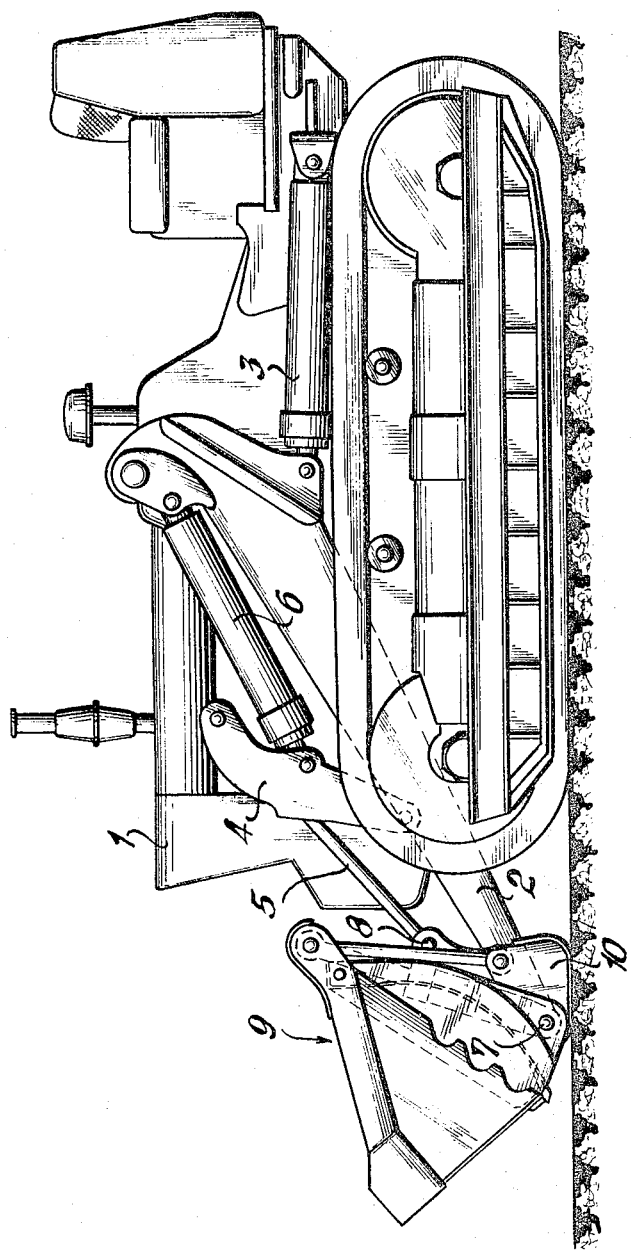
INVENTOR
Johann Sagerer

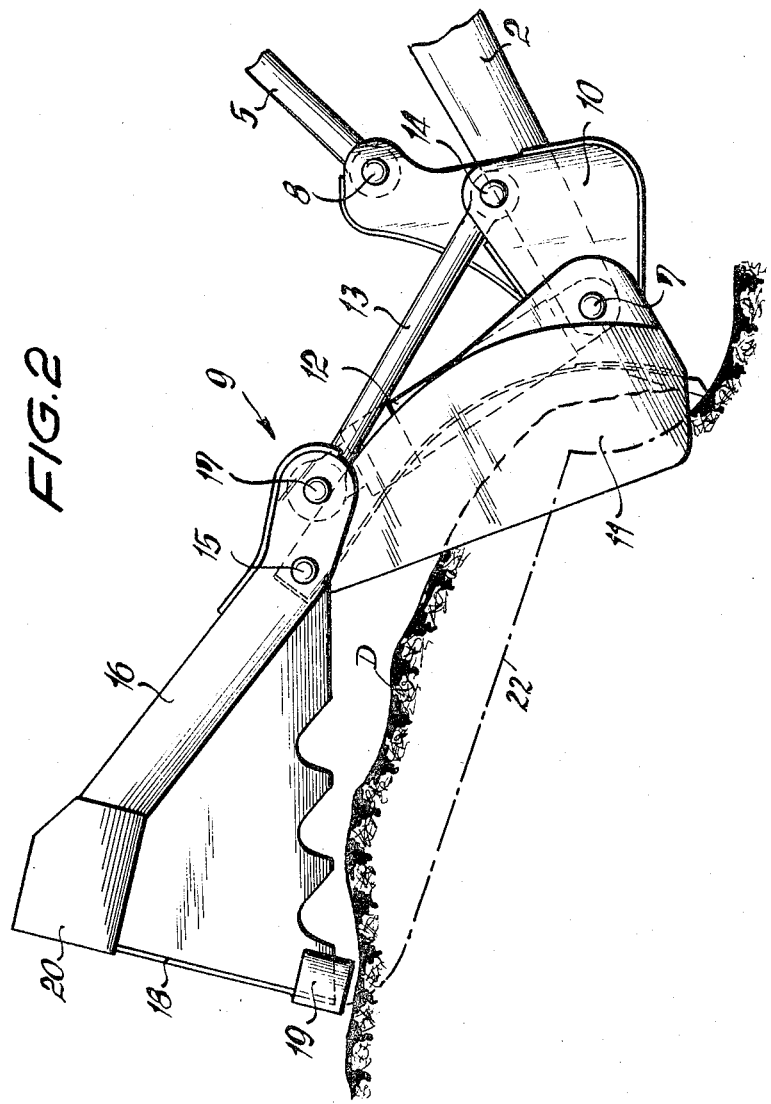

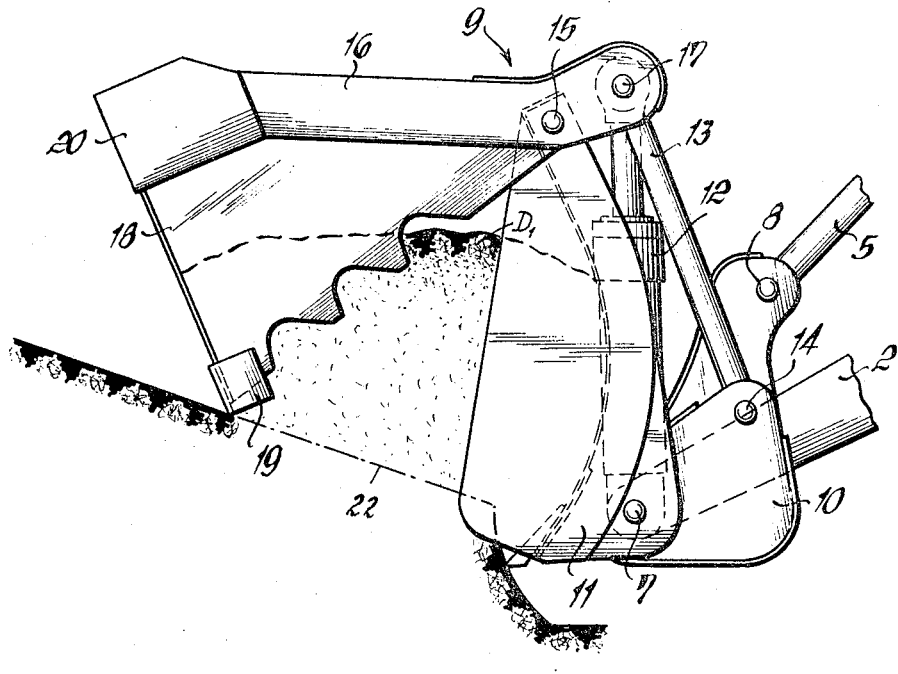
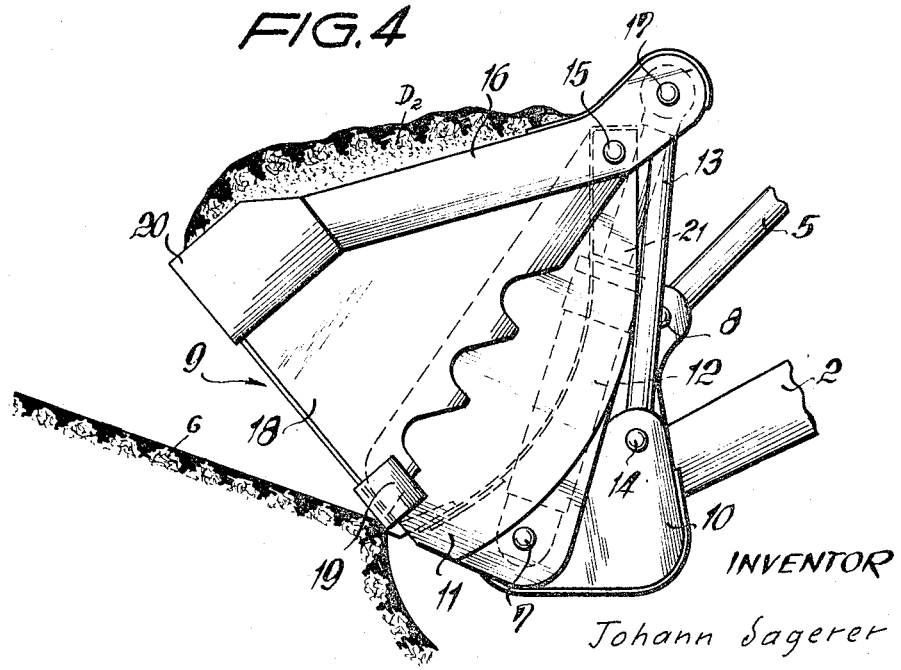

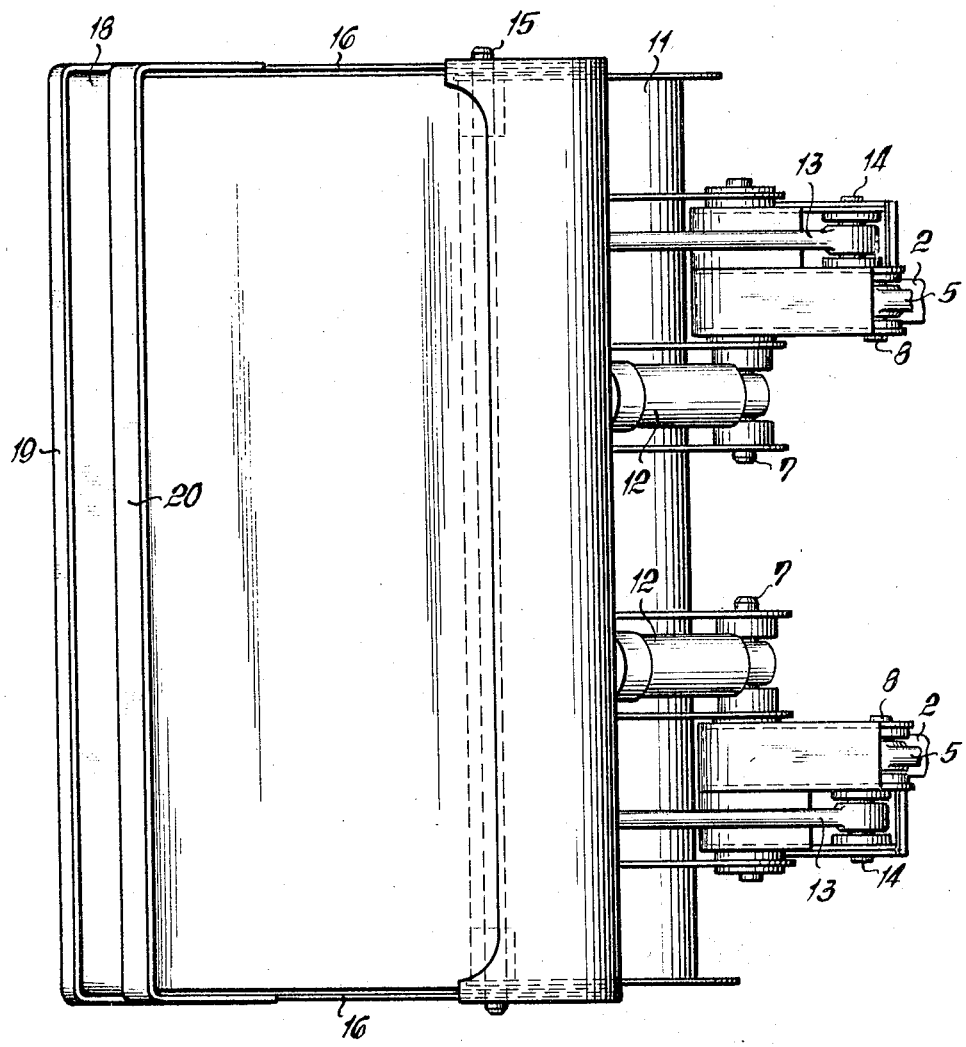

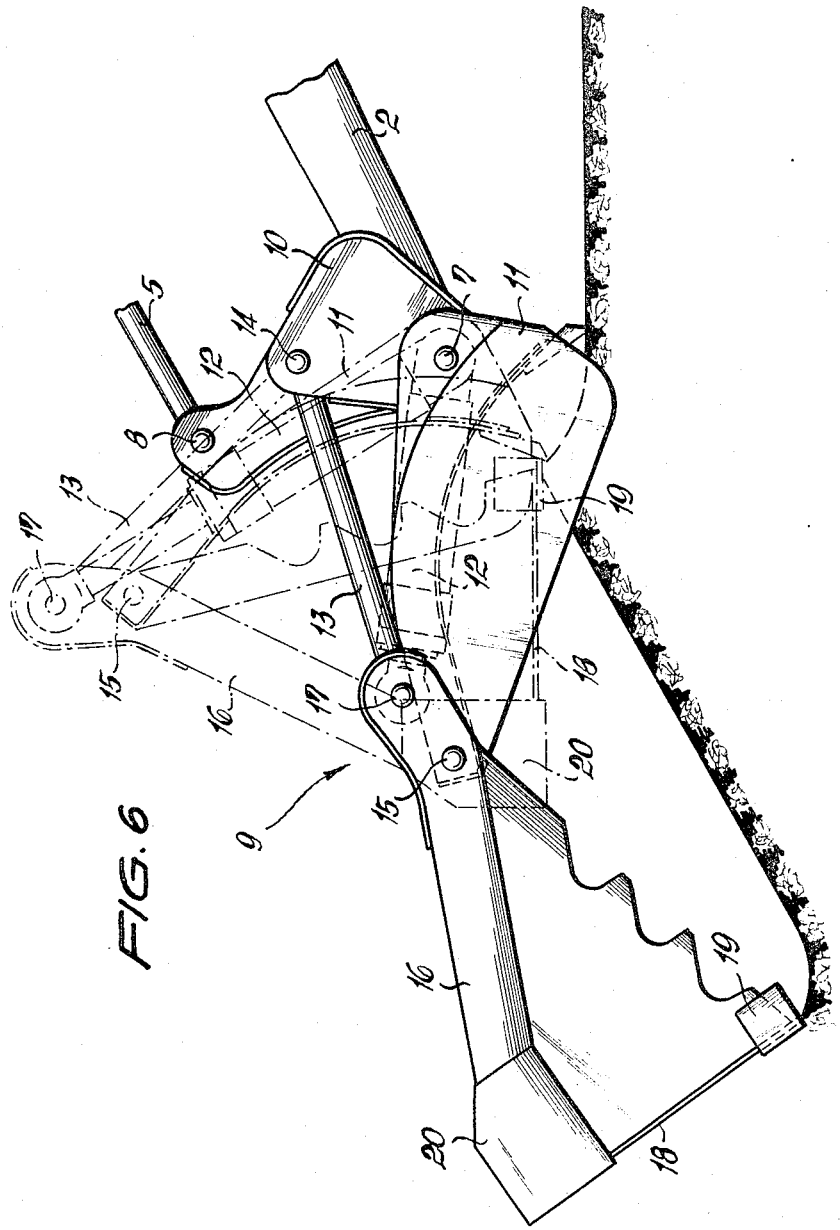

United States Patent Office 3,296,720
Patented Jan. 10, 1967

3,296,720
GRAB SHOVEL FOR TRACTIVE VEHICLES
Johann Sagerer, Unterhaching, near Munich, Germany, assignor to F. X. Meiller Fahrzeug- und Maschinenfabrik K.G., Munich, Germany, a company of Germany
Filed Aug. 29, 1963, Ser. No. 305,365
Claims priority, application Germany, Sept. 4, 1962, M 54,132
5 Claims. (Cl. 37—117.5)

This invention relates to a grab shovel. The shovel is power-actuated and may be used with vehicles equipped with a wheel drive or an endless belt drive. Especially, the invention relates to the class of power-actuated load-handling devices which are disposed at the forward end of vehicles.

The term "grab shovel" is meant to cover two-part loading devices. One of the two parts, which has a barrierlike function and may be referred to as the rear part, is pivotally supported by carrier arms of the respective vehicle. The other or front part is pivotally connected to the rear part for swinging movements relative to the rear part.

For loading purposes and with conventional earth-moving vehicles, the rear or shield-shaped part of the grab shovel, which has the referred to barrierlike function, is positioned so as to extend perpendicularly to the ground and is then forced into the material. As soon as enough material appears collected in front of the shield part, the other shovel part which may be referred to as the swing part and has been open during the preceding portion of the loading operation is swung toward the shield part to enclose and to help hold the material in front of the shield part. In order to transport without looses the material held, it is now necessary to tilt the closed shovel. Thus, two fluid circuits are needed for the complete loading operation, one circuit being used to cause the closing movement of the swing part, the other circuit serving to tilt the closed shovel. The need for two separate fluid circuits constitutes an important disadvantage.

Associated with the referred to disadvantage are other disadvantages. The known material-handling machines are not sufficiently versatile in operation and often necessitate the assistance of auxiliary equipment, for instance, for the purpose of horizontally cutting through material. The requirement of a second fluid circuit increases the capital investment for particular earth-moving operations.

The primary object of the present invention is to provide a grab shovel which is devoid of the aforeindicated shortcomings. Other objects of the invention center about a grab shovel which is simple and sturdy in construction and efficient and economical in operation. More specific objects of the invention are to provide a grab shovel which removes material across plane surfaces and thus flattens the ground, and which can be operated independently from the operation of the vehicle.

Broadly, my invention provides a grab shovel for tractive vehicles, which comprises a first or shield part, a second or swing part, bracket means, link means, and four pivot means. The latter pivotally connect the shield and swing parts (first pivot means), the shield part and bracket means (second pivot means), the link means and swing part (third pivot means), and the link means and bracket means (fourth pivot means). The pivotal axes of the four pivot means extend transversely of the longitudinal axis of the vehicle.

Other features and the attendant advantages of the invention will be readily appreciated as the invention becomes better understood from the following description when considered in connection with the drawings which accompany the specification and in which:

FIG. 1 is an elevation of a crawler tractor and a shovel, the shovel embodying features of the invention and being shown in closed condition;

FIG. 2 is an elevation, to enlarged scale, of the shovel of FIG. 1 in open condition;

FIG. 3 shows the shovel in partly closed condition;

FIG. 4 shows the shovel in closed condition as does FIG. 1;

FIG. 5 is a plan view of the shovel; and

FIG. 6 illustrates the shovel in two operating positions.

Referring to the drawings in greater detail now, and initially to FIG. 1, there is shown an industrial crawler tractor 1 to the frame of which a carrier arm 2 is pivoted about a fixed axis on said frame. A single arm only is shown but it will be appreciated that there are two such arms, that is, two operational units to complete the loader. In describing the loading mechanism, one unit will be here referred to only. The pivotal movements of the arm 2 are effected by a hydraulic cylinder 3, and pivotally supported on the arm 2 are a tilting lever 4 and a rod 5. A hydraulic cylinder 6 actuates the rod 5 relative to the arm 2. The arm 2 and rod 5 are pivoted at their front ends, respectively, by means of a pin 7 to a bracket 10 and a shield part 11, and by means of a pin 8 to the bracket 10.

From FIGS. 2 to 4 it can best be seen that a grab shovel generally designated 9 consists of the aforementioned shield part 11 and a swing part 16. These two parts are pivotally connected to each other at 15. The bracket 10 pivotally supports the shield part 11 at 7 and is, in turn, pivotally supported, as has been indicated, by the arm 2 and the rod 5. Thus, the pivot means 7 pivotally connects not only the bracket 10 and the shield part 11 but also the bracket and shield part, on one hand, and arm 2, on the other.

Additionally pivoted to the bracket 10, besides the shield part 11, the arm 2, and the rod 5 are a link 13 and a hydraulic cylinder 12. The pivotal connection of the link 13, at one end thereof, with the bracket 10 is at 14, the link 13 being pivoted at its other end to the swing part 16 at 17. The hydraulic cylinder is pivoted to the bracket 10 at 7, and to the swing part 16 at 17.

The swing part has a bottom 18 and two cutting bits 19 and 20.

FIG. 5 illustrates two operational units as they serve a single shovel, and also show the pivotal connections of the parts involved at 7, 14, and 8.

In the operation of my power-actuated grab shovel which is arranged at the forward end of a mobile vehicle 1, the vehicle is driven to the location where a load is to be engaged, and the shovel is positioned at the load. The present shovel may be used, for instance, for removing, loading, hauling, dumping, and spreading of earth materials. When fluid under pressure is admitted to the cylinders 3, 6, and 12, each respective piston moves outwardly. Although there exists a single fluid circuit only according to the invention, there are means provided in the hydraulic system to control the operation of the various cylinders. Neither the hydraulic system nor the control means form parts of this invention and are, therefore, not shown.

The operation of the hydraulic cylinder 12 can clearly be seen from FIGS. 2 to 4. FIG. 2 shows the shovel 9 in open condition. The shield part 11 and swing part 16 are in swung-apart positions, and their interiors face the dirt that is to be picked up. When the cylinder 12 is energized, and as a piston rod 21 of the cylinder moves outwardly (not seen in FIG. 2, but in FIGS. 3 and 4), the swing part 16 is caused to carry out a pivotal movement about the axis 15 in counter-clockwise direction. The bit 19 will move across a plane indicated by the dash-dotted line 22 and perform a scraping action to loosen dirt D from the ground G and to help collect the loosened dirt. FIG. 3 shows the shovel in partly closed condition and dirt $D_1$ that has been collected during the pivotal movement of the swing part 16, so far carried out. The piston rod 21 is shown in FIG. 3 to project partly outwardly, and the bit 19 is in an incompleted scraping position. The pivotal movement of the swing part 16 continues, as the piston rod 21 moves further out, until the swing part 16 and gate part 11 engage each other and the shovel is closed. The bit 19 has completed its closing travel, and all the dirt that has been loosened is safely held within the closed shovel, the full capacity amount of dirt being designated $D_2$.

The shovel-filling operation which is illustrated by the development stages of FIGS. 2 to 4 is controlled by the hydraulic cylinder 12 only, but the invention also provides facilities to tilt the shovel. These facilities include the arm 2 pivotally connected with the shield part 11 at 7, and the rod 5 pivoted to the bracket 10 at 8, and are used to adjust the position of the shovel, prior to its filling, to the given terrain. FIG. 6 illustrates the removal of soil on a slope. To prepare the shovel for this purpose, the bracket 10 is given a pivotal movement about the axis 7 in counter-clockwise direction by the link 5. The degree of this pivotal movement depends on the slope inclination. The link 5 is actuated, as has been stated, by the hydraulic cylinder 6. The showing in FIG. 6 in solid lines represents the open condition of the shovel, with the piston rod of the cylinder being retracted and invisible, while the broken lines show the closed shovel condition, the piston rod extending outwardly all the way as in the case of FIG. 4. Upon completion of the filling, the shovel, still in a tilted position, is returned to the position shown in FIG. 4, again by means of the rod 5 over the bracket 10.

It is believed that the construction and operation of a preferred form of apparatus for practicing the invention, and the many advantages of the invention, will be understood from the foregoing detailed description. Some of the features of the invention are reviewed hereinafter.

As can clearly be seen from any of FIGS. 1 to 4, the invention provides four pivot means which operate as a closed four-link mechanism, the four pivot means being 15, 17, 14, and 7. The arrangement of the pivot means, as far as the distances between them are concerned, is chosen so as to ensure that the bit 19, on a pivotal movement of the bracket 10 in a counter-clockwise direction, will move in a plane. This makes plane removal of material and flattening of the ground possible.

The whole shovel is tiltable due to the pivotal connection of the bracket 10 with the arm 2 and the provision of the rod 5. The tilting of the shovel makes easy adjustments to upward and downward grades possible.

Known grab shovels have been operated, as appears indicated hereinbefore, by forcing the rear part of the shovel more or less edgewise into the material. This was accomplished by a forward movement of the vehicle. The present invention makes such forward movement of vehicles unnecessary. The removal of material, according to the invention, is accomplished by the shovel alone, that is, by the pivotal movement of what is referred to herein as the swing part of the shovel. The vehicle and its driving mechanism are relieved. The operation of the shovel is independent from the traction conditions as they exist in any given case. The operator of the machine is unburdened because the operations of the vehicle and shovel need no longer coincide.

In the construction selected for illustration, the hydraulic cylinder 12 is pivotally connected, at one end, to the pivot connection 7 between bracket 10 and shield part 11, and at the other end to the pivot connection 17 between link 13 and swing part 16. The cylinder 12 thus extends in the diagonal of the four-link mechanism, which constitutes a useful arrangement of the cylinder and makes for small relative movements of the shield part and the cylinder.

It will be apparent that while I have shown and described my invention in a preferred form only, many changes and modifications may be made without departing from the spirit of the invention defined in the following claims.

I claim:
1. A grab shovel for tractive vehicles having a longitudinal axis, said grab shovel comprising:
 (a) a first or shield part;
 (b) a second or swing part;
 (c) bracket means;
 (d) link means;
 (e) first pivot means for pivotally connecting said shield and swing parts;
 (f) second pivot means for pivotally connecting said shield part and bracket means;
 (g) third and fourth pivot means for pivotally connecting said link means at one end thereof with said swing means, and at the other end with said bracket means,
  (1) the pivotal axes of said first, second, third, and fourth pivot means extending transversely of the vehicle axis; and
 (h) power means pivotally connected to said second and third pivot means for causing said swing part to swing about said first means.
2. In the shovel according to claim 1, carrier arm means pivotally connected at one end thereof to a vehicle, and at the other end to said bracket means.
3. In the shovel according to claim 2, said second pivot means connecting said carrier arm means with said bracket means.
4. In the shovel according to claim 1, said shield part, swing part, bracket means, and link means forming a closed four-link mechanism, said power means extending in a diagonal of said mechanism.
5. In the shovel according to claim 1, rod means pivotally connected to said bracket means for pivoting the bracket means about said second pivot means.

References Cited by the Examiner

UNITED STATES PATENTS

| | | | |
|---|---|---|---|
| 2,326,338 | 8/1943 | Drott et al. | 37—117.5 |
| 2,812,595 | 11/1957 | Drott | 37—117.5 |
| 2,903,803 | 9/1959 | Austin | 37—117.5 |
| 3,077,999 | 2/1963 | Svoboda | 37—117.5 X |
| 3,148,465 | 9/1964 | Beyerstedt et al. | 37—117.5 |
| 3,209,474 | 10/1965 | Artman | 37—117.5 |
| 3,209,475 | 10/1965 | Salna | 37—117.5 |

ABRAHAM G. STONE, *Primary Examiner.*

R. L. HOLLISTER, *Assistant Examiner.*